J. W. PLUMMER.
FEEDING ATTACHMENT FOR PNEUMATIC STACKERS.
APPLICATION FILED OCT. 22, 1912.

1,076,057.

Patented Oct. 21, 1913.

2 SHEETS—SHEET 1.

Witnesses

J. W. Plummer,
Inventor by C. A. Snow & Co.
Attorneys

J. W. PLUMMER.
FEEDING ATTACHMENT FOR PNEUMATIC STACKERS.
APPLICATION FILED OCT. 22, 1912.

1,076,057.

Patented Oct. 21, 1913.

2 SHEETS—SHEET 2.

Witnesses

J. W. Plummer,
Inventor
by C. A. Snow & Co.
Attorneys

UNITED STATES PATENT OFFICE.

JOHN W. PLUMMER, OF MORRILL, NEBRASKA.

FEEDING ATTACHMENT FOR PNEUMATIC STACKERS.

1,076,057.      Specification of Letters Patent.      Patented Oct. 21, 1913.

Application filed October 22, 1912. Serial No. 727,256.

*To all whom it may concern:*

Be it known that I, JOHN W. PLUMMER, a citizen of the United States, residing at Morrill, in the county of Scotts Bluff and State of Nebraska, have invented a new and useful Feeding Attachment for Pneumatic Stackers, of which the following is a specification.

This invention relates to mechanism for feeding straw, chaff, and the like to pneumatic or "wind" stackers, one of its objects being to provide simple mechanism of this character which will prevent the stacker from becoming choked at its feed end or inlet and which is simple and compact in construction and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
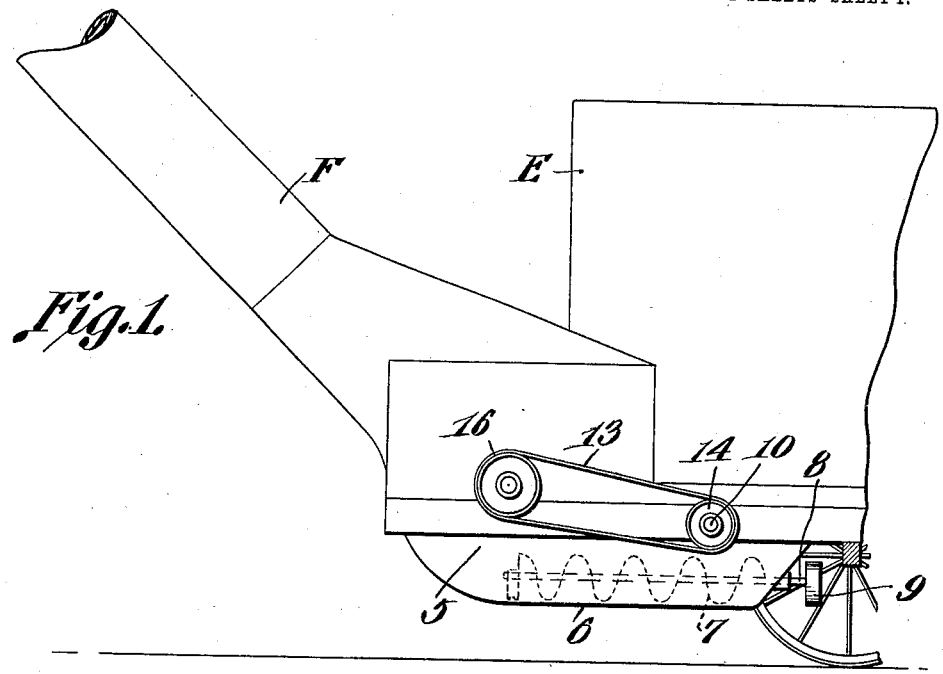
Figure 2:
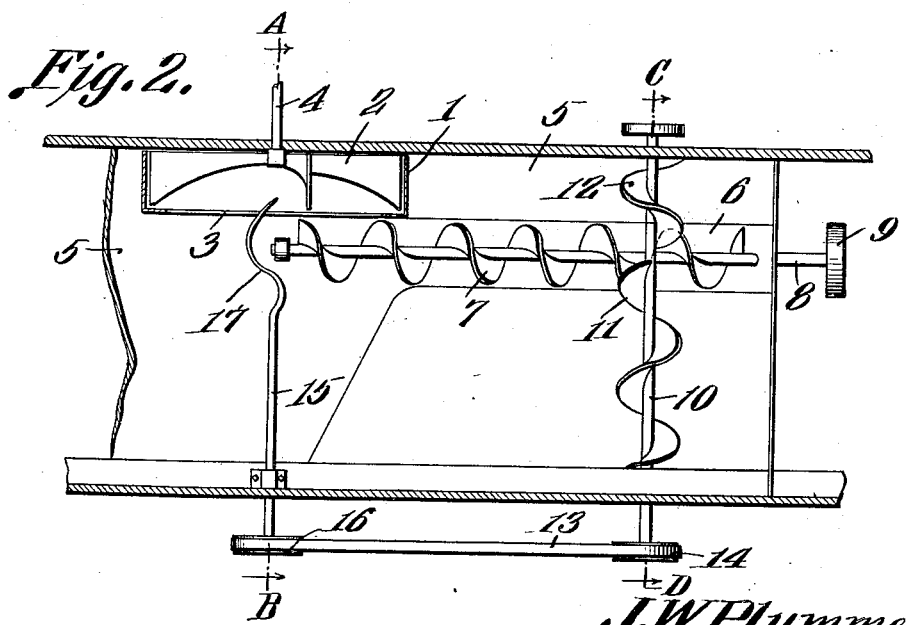
Figure 3:
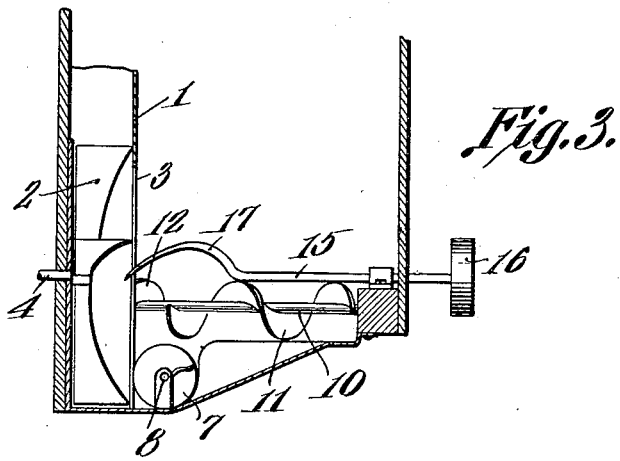
Figure 4:
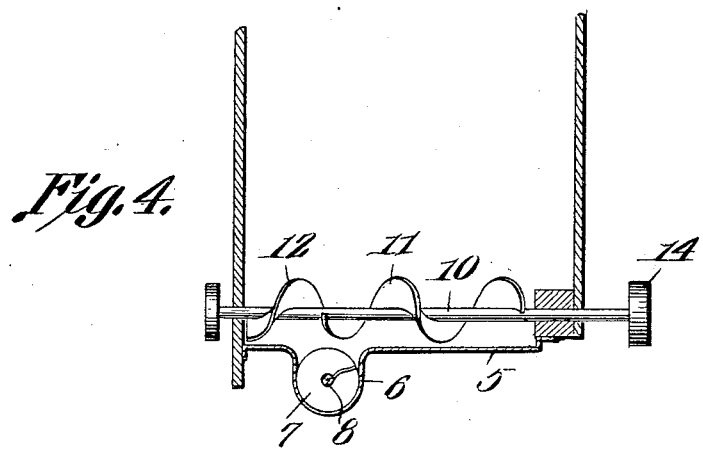
Figure 5:
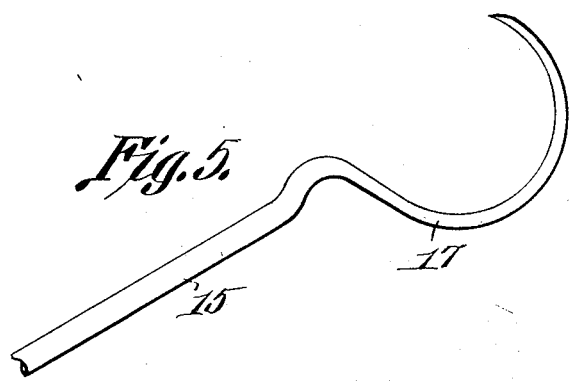

In said drawings:—Figure 1 is a side elevation of a portion of a stacker having the present improvements combined therewith. Fig. 2 is a horizontal section showing the feeding mechanism. Fig. 3 is a section on line A—B Fig. 2. Fig. 4 is a section on line C—D Fig. 2. Fig. 5 is a detail view of the straw feeding member.

Referring to the figures by characters of reference E designates a portion of a threshing machine from which extends the usual stacker tube F. Arranged at the lower end of the stacker tube is a casing 1 in which is mounted a rotary fan 2. This casing 1 has a central inlet opening 3 in one side thereof and has a peripheral discharge opening communicating with the interior of the tube F. The fan 2 is driven by a horizontal shaft 4, any suitable means being provided for actuating the shaft.

A broad trough 5 leads up to and across the open side of the casing 1 and is provided, in its bottom, with a longitudinal channel or gutter 6 which extends close to the open side of the casing 1. A feed worm 7 is arranged within the gutter 6 and terminates at one end opposite the center of the inlet opening 3. The shaft 8 of this feed worm may be driven in any suitable manner, as by the means of a belt or the like mounted on a pulley 9 secured to the shaft. The worm is so pitched that when the shaft is rotated in one direction, any chaff or small particles of straw which may be directed into the gutter 6 will be conveyed longitudinally of the gutter and to the inlet opening 3.

Extending transversely of the trough 5 and above the shaft 8 is a shaft 10 on which are arranged two oppositely pitched worms 11 and 12 respectively. Shaft 10 may be driven by means of a belt 13 or the like mounted on a pulley 14 and when this shaft is rotated in one direction, the two worms 11 and 12 operate to direct material from the two sides of the trough 5 toward the gutter 6 where the material will be engaged and conveyed by the worm 7.

Extending partly across the trough 5 and alining with the center of the opening 3 is a shaft 15 having a pulley 16 which may be driven by the belt 13. That end of the shaft nearest the casing 1 is bent spirally or in the form of a corkscrew, as shown at 17 so that, when shaft 15 is rotated in one direction, the spiral terminal thereof will operate to feed straw transversely of the trough and into the opening 3, the construction of the corkscrew end 17 being such as not to interfere with the admission of air to the fan casing through the inlet 3. By referring to the drawings it will be seen that the end of the spiral portion 17 projects into the casing 1 so that it thus acts positively to force the straw into position where it will be engaged by the fan 2.

Obviously, when the shafts are rotating in the proper direction, straw discharged into the trough 5 will be engaged by the spiral portion 17 and forced into casing 1 whereby the blades of the rotating fan blow the straw into the tube F through the outlet opening of the casing. Any chaff or fine straw which may be deposited in the trough 5 will be shifted laterally by the worms 11 and 12 so as to fall into the gutter 6 where the worm conveyer 7 will engage it and shift it longitudinally to the opening 3. At this point the suction created by the fan will cause the chaff and fine straw to be drawn into the casing and then blown therefrom through the peripheral outlet.

By providing mechanism such as herein described there is no danger of the inlet opening of the stacker tube becoming clogged inasmuch as all material is forcibly projected through said inlet opening and into the path of the fan blades. Furthermore the mechanism provided constitutes efficient means for carrying all of the fine particles such as chaff and small pieces of straw to the fan casing so that there will not be an objectionable accumulation of fine material on the bottom of the trough 5.

In addition to the advantages hereinbefore set forth with reference to this invention, it might be stated that, by providing the structure herein described, the power necessary to drive the stacker is greatly reduced. Furthermore, the mechanism herein described will not chop or break the straw but will discharge it through the stacker practically whole. The device keeps the wheel on the separator clear of straw, trash, etc., so that it will not clog and the wheel is thus left open at all times for the currents of air to pass thereto, thus permitting the separator to do much better work.

What is claimed is:—

1. The combination with a fan casing having a side inlet and a peripheral outlet, a revoluble fan in the casing, and a stacker tube extending from the outlet, of a corkscrew conveyer having its axis of rotation in alinement with the axis of rotation of the fan and the free end of said conveyer projecting through the inlet, for directing material into the path of the fan blades, and a worm conveyer for directing material into engagement with the corkscrew conveyer.

2. The combination with a fan casing having a side inlet and a peripheral outlet, a stacker tube extending from the outlet, and a revoluble fan within the casing, of a trough having a gutter therein leading across one side of the casing and to the inlet, a worm conveyer within the gutter, transversely extending revoluble worms for directing materials from the sides of the trough to the gutter, and a spiral revoluble above the trough and having its axis of rotation in alinement with the axis of the fan, the end of the spiral projecting through the inlet in the casing.

In testimony that I claim the foregoing as my own, I have hereto affixed my signature in the presence of two witnesses.

JOHN W. PLUMMER.

Witnesses:
G. J. CARPENTER,
D. N. PLUMMER.

---

Copies of this patent may be obtained for five cents each, by addressing the "Commissioner of Patents, Washington, D. C."